United States Patent Office
2,996,433
Patented Aug. 15, 1961

2,996,433
RADIOPAQUE FORMULATIONS
James O. Hoppe, Bethlehem, and Horace P. Maietta, Albany, N.Y., assignors to Sterling Drug Inc., New York, N.Y., a corporation of Delaware
No Drawing. Filed Sept. 11, 1958, Ser. No. 760,296
9 Claims. (Cl. 167—95)

This invention relates to radiopaque formulations, and in particular it is concerned with suspensions of finely divided, substantially insoluble, pharmacologically acceptable radiopaque substances in aqueous media containing a polyethylene glycol and a pharmacologically acceptable surfactant.

The formulations of our invention have been found to be particularly useful for radiographic visualization of body cavities upon direct administration as a diagnostic aid, especially in the field of bronchography. All of the bronchographic agents known up to the present time possess one or more serious drawbacks, e.g., improper rate of flow, failure to deposit a uniform coating on the bronchial tree, alveolar flooding with resulting chemical pneumonia, or failure to be absorbed or assimilated with resulting irritation to the local tissues. Some of the previous formulations have made use of carboxymethylcellulose as a thickening agent, but this substance has been found to be irritating to the tissues with which it comes in contact. Purified gelatin suitable for parenteral administration has also been used as a thickening agent, but this substance has proved unsatisfactory because, in common with most viscosity-producing hydrocolloids, it exhibits a pronounced decrease of viscosity with increase of temperature within the range from room temperature (about 25° C.) to body temperature (37–39° C.). Thus, although a suspension of a radiopaque substance containing gelatin is extremely viscous at room temperature, it becomes excessively fluid at body temperature resulting in extensive flooding of the alveolar sacs.

We have now found that if a pharmacalogically acceptable, substantially insoluble radiopaque substance is suspended in an aqueous medium containing a polyethylene glycol and a small quantity of a pharmacologically acceptable surfactant, a highly satisfactory bronchographic formulation is produced which possesses the following advantages:

(1) The formulations exhibit an unexpected inverse viscosity-temperature relationship. Thus, at room temperature (about 25° C.) the suspensions are sufficiently fluid to be withdrawn into a syringe and to permit easy instillation into the bronchial tree with little or no attendant discomfort. As the temperature of the suspension equilibrates with the body temperature of the animal subject, its viscosity increases. At body temperature (37–39° C.) the viscosity becomes approximately twice as great as at room temperature. Thus, this increase in viscosity reduces the mobility of the suspension during its descent into the lower regions of the bronchial tree serving to prevent alveolar flooding.

(2) The composition constituting the invention is not limited to the use of any particular radiopaque substance, but is applicable to any pharmacologically acceptable, substantially insoluble, solid substance having sufficient heavy atom content to produce clearly delineated shadows upon X-ray photographs. Preferred radiopaque substances are non-toxic, iodinated organic compounds, although other heavy atom containing organic or inorganic compounds, for example, barium sulfate or zirconium oxide, can also be utilized. The amount of radiopaque substance present can be varied within wide limits, although it is preferred that at least about 50 percent by weight, relative to the final volume be present to provide a formulation of sufficient radiopacity. The radiopaque can be present to the extent of as much as about 90 percent by weight, although 50–70% is a preferred range for formulations of the most desirable viscosity.

(3) The formulations of the present invention deposit a uniform coating of the radiopaque substance on the inner surfaces of the bronchial tree without interfering with respiratory exchange and with little or no penetration of the alveolar spaces.

(4) The vehicle of the formulation is non-irritating, non-toxic, and is readily eliminated.

The viscosity of the formulations of our invention varies within wide limits between about 5000 and 20,000 centipoises at body temperature. A preferred range of viscosity for bronchographic purposes lies between about 10,000 and 15,000 centipoises. The viscosity is dependent upon the following factors:

(a) The content of polyethylene glycol
(b) The content of surfactant
(c) The nature of the radiopaque substance
(d) The content of radiopaque substance
(e) The particle size of the radiopaque substance
(f) The presence of other ingredients
(g) The temperature Other factors being constant, the viscosity of the suspension decreases with decrease in polyethylene glycol content. We have found the most useful range of polyethylene glycol content to be about 5–10 percent by weight relative to the final volume of the suspension. However, either lower or higher concentrations of polyethylene glycol, between about 1 and 20 percent by weight, can be employed by concurrently adjusting the concentration of surfactant, or the concentration or particle size of the radiopaque substance. In the absence of polyethylene glycol, the formulations produce severe alveolar flooding and chemical pneumonia.

Other factors being constant, the viscosity of the suspension decreases with increasing concentration of the surfactant until a limit is approached beyond which the viscosity remains relatively constant. The limiting viscosity is dependent on the nature and the average particle size of the radiopaque substance. Thus, suspensions of a radiopaque substance exhibiting a higher degree of hydrophobic character require a higher concentration of surfactant to reach the limiting viscosity. Concurrently, suspensions of a given radiopaque substance require a higher concentration of surfactant to reach the limiting viscosity as the average particle size of the radiopaque substance is decreased. The amount of surfactant is small relative to the amount of radiopaque and thickening agent, being present to the extent of from about 0.01 to about 0.5 percent relative to the final volume of the suspension. We have found the most useful range of surfactant concentration to be 0.1 to 0.3 percent by weight relative to the final volume of the suspension.

Other factors being constant, the viscosity of the suspension increases with increasing content of the radiopaque substance.

Other factors being constant, the viscosity of the suspension decreases with increasing particle size of the radiopaque substance.

The presence of additional ingredients in the formulation, such as buffers and sequestering agents, will also alter the viscosity.

In view of the large number of variables affecting the viscosity, the absolute viscosity value for a given formulation cannot be predicted with accuracy. However, it is always possible to alter the composition of a given formulation to give one with a viscosity of any desired value by altering the relative amount of polyethylene glycol, surfactant or radiopaque, knowing the effect of each of these upon the viscosity. For example, if the viscosity is higher than is desired, it can be decreased by adding additional surfactant, whereas if the viscosity is lower than is desired, it can be increased by adding additional polyethylene glycol or radiopaque.

The polyethylene glycols used as thickening agents in our formulations can be any of the commercially available polyethylene glycols which have molecular weights varying from 400 to 20,000. The preferred polyethylene glycols are those having an average molecular weight between about 2000 and 10,000, polyethylene glycol 6000 being an especially preferred species.

The exact nature of the surfactant is not critical, provided it is non-toxic to the animal organism in the relatively minute quantities used. A preferred surfactant is polyethylene glycol 600 monooleate. Other surfactants, however, can be used, including oxyethylated p-tertiary-octylphenol-formaldehyde polymers, e.g., "Superinone" (also known by the trade name Triton WR–1339), polyoxyalkylene ethers of partial higher fatty acid esters of polyhydroxy alcohol type non-ionic surface active agents (e.g., Tween 20 and 80), and the like.

For optimum results the particle size of the suspended radiopaque substance should be as small as can be obtained with conventional equipment to permit uniform coating and penetration of the fine structure of the bronchial tree as well as facile elimination thereafter. The practical range of average particle size is about 1 to 10 microns in diameter, with all particles below about 30 microns.

Optionally, additional ingredients, such as buffer substances, e.g., sodium or potassium acid phosphates, and sequestering agents, e.g., salts of ethylenediaminetetraacetic acid, can be present in our formulations.

The compositions of our invention are prepared by intimate mixing of the components followed by autoclaving, i.e., heating in sealed containers at a temperature between about 100° C. and 150° C., for the purpose of sterilization.

The following examples will illustrate the invention more fully without the latter being limited thereby.

Example 1

Propyl 3,5-diiodo-4-pyridone-N-acetate (50 g.) was micronized until the average particle size was about 4–8 microns and all particles were smaller than 30 microns. To this was added a solution of 0.25 g. of polyethylene glycol 600 monooleate in 2.5 ml. of water and a solution of 5.0 g. of polyethylene glycol 6000 in 10 ml. of water, and the mixture was stirred until a stiff paste was formed. There was then added a solution of 5.0 g. of polyethylene glycol 6000 in 10 ml. of water and enough additional water was added to produce a total volume of 100 ml. The suspension was mixed thoroughly, passed through a 100 mesh screen, placed in 10 ml. vials and autoclaved at 121° C. for 20 minutes. This formulation was tested as a bronchographic agent in cats and provided fair to good visualization and penetration of the bronchial tree, with elimination of the contrast medium in five to seven days.

Similarly were prepared and tested the following formulations, each of which gave good visualization of the bronchial tree in cats with little or no alveolar flooding and facile elimination of the contrast medium. In each of the formulations the average particle size of the radiopaque was within the range of 1 to 10 microns. Viscosity measurements were taken on a Brookfield Model RVF viscometer.

Example 2

65 g. barium sulfate
0.25 g. polyethylene glycol 600 monooleate
10 g. polyethylene glycol 6000
Distilled water to make total volume 100 ml.

Example 3

70 g. barium sulfate
0.25 g. polyethylene glycol 600 monooleate
10 g. polyethylene glycol 6000
Distilled water to make total volume 100 ml.

Example 4

18 g. ethyl 3,5-diacetamido-2,4,6-triiodobenzoate
3 g. polyethylene glycol 6000
0.0185 g. Superinone
Distilled water to make total volume 30 ml.

Example 5

18 g. ethyl 3,5-diacetamido-2,4,6-triiodobenzoate
3 g. polyethylene glycol 6000
0.0525 g. polyethylene glycol 600 monooleate
Distilled water to make total volume 30 ml.

Example 6

24 g. ethyl 3,5-diacetamido-2,4,6-triiodobenzoate
4 g. polyethylene glycol 4000
0.07 g. polyethylene glycol 600 monooleate
0.022 g. monobasic sodium phosphate ($NaH_2PO_4 \cdot H_2O$)
0.08 g. dibasic sodium phosphate ($Na_2HPO_4 \cdot 7H_2O$)
Distilled water to make total volume 40 ml.

Example 7

24 g. ethyl 3,5-diacetamido-3,4,6-triiodobenzoate
6 g. polyethylene glycol 4000
0.07 g. polyethylene glycol 600 monooleate
0.022 g. monobasic sodium phosphate ($NaH_2PO_4 \cdot H_2O$)
0.08 g. dibasic sodium phosphate ($Na_2HPO_4 \cdot 7H_2O$)
Distilled water to make total volume 40 ml.

Example 8

60 g. ethyl 3,5-diacetamido-2,4,6-triiodobenzoate
10 g. polyethylene glycol 6000
0.175 g. polyethylene glycol 600 monooleate
0.112 g. monobasic sodium phosphate ($NaH_2PO_4 \cdot H_2O$)
0.4 g. dibasic sodium phosphate ($Na_2HPO_4 \cdot 7H_2O$)
Distilled water to make total volume 100 ml.

Example 9

60 g. ethyl 3,5-diacetamido-2,4,6-triiodobenzoate
10 g. polyethylene glycol 6000
0.20 g. polyethylene glycol 600 monooleate
0.112 g. monobasic sodium phosphate ($NaH_2PO_4 \cdot H_2O$)
0.4 g. dibasic sodium phosphate ($Na_2HPO_4 \cdot 7H_2O$)
Distilled water to make total volume 100 ml.

Example 10

60.0 g. ethyl 3,5-diacetamido-2,4,6-triiodobenzoate
0.20 g. polyethylene glycol 600 monooleate
10.0 g. polyethylene glycol 6000
Distilled water to make total volume 100 ml.

Example 11

60.0 g. ethyl 3,5-diacetamido-2,4,6-triiodobenzoate
0.25 g. polyethylene glycol 600 monooleate
10.0 g. polyethylene glycol 6000
Distilled water to make total volume 100 ml.

Example 12

600.0 g. ethyl 3,5-diacetamido-2,4,6-triiodobenzoate
82.5 g. polyethylene glycol 6000
2.5 g. polyethylene glycol 600 monooleate
0.1 g. calcium disodium ethylenediaminetetraacetate
0.588 g. dibasic potassium phosphate ($K_2HPO_4$)
0.412 g. monobasic potassium phosphate ($KH_2PO_4$)
Distilled water to make total volume 1000 ml.

This formulation had viscosities at 26.5° C. and 37.5° C. of 5,750 and 11,900 centipoises, respectively. The suspension had a pH of 6.95.

Example 13

60.0 g. ethyl 3,5-diacetamido-2,4,6-triiodobenzoate
5.0 g. polyethylene glycol 6000
0.20 g. polyethylene glycol 600 monooleate
Distilled water to make total volume 100 ml.

Example 14

60.0 g. ethyl 3,5-diacetamido-2,4,6-triiodobenzoate
7.5 g. polyethylene glycol 6000
0.20 g. polyethylene glycol 600 monooleate
Distilled water to make total volume 100 ml.

Example 15

60.0 g. ethyl 3,5-diacetamido-2,4,6-triiodobenzoate
2.5 g. polyethylene glycol 6000
0.20 g. polyethylene glycol 600 monooleate
Distilled water to make total volume 100 ml.

Example 16

60.0 g. ethyl 3,5-diacetamido-2,4,6-triiodobenzoate
1.25 g. polyethylene glycol 6000
0.20 g. polyethylene glycol 600 monooleate
Distilled water to make total volume 100 ml.

Example 17

The following table shows the effect of change of concentration of surfactant upon the viscosity of formulations containing 60 percent by weight of ethyl 3,5-diacetamido-2,4,6-triiodobenzoate and 10 percent by weight of polyethylene glycol 6000 relative to the total volume.

| Weight percent of polyethylene glycol 600 monooleate | Viscosity (centipoises) | |
|---|---|---|
| | at 25° C. | at 37.5° C. |
| 0.200 | 7,050 | 15,000 |
| 0.225 | 4,900 | 10,250 |
| 0.250 | 4,700 | 10,300 |
| 0.275 | 4,700 | 10,000 |
| 0.300 | 4,500 | 10,050 |

Example 18

The following table shows the effect of change of concentration of polyethylene glycol 6000 upon the viscosity of formulations containing 60 percent by weight of ethyl 3,5-diacetamido-2,4,6-triiodobenzoate, 0.25 percent by weight of polyethylene glycol 600 monooleate, 0.01 percent by weight of calcium disodium ethylenediaminetetraacetate, 0.0588 percent by weight of dibasic potassium phosphate ($K_2HPO_4$) and 0.0412 percent by weight of monobasic potassium phosphate ($KH_2PO_4$) relative to the total volume.

| Weight percent of polyethylene glycol 6000 | Viscosity (centipoises) at 37.5° C. |
|---|---|
| 10.0 | 14,250 |
| 9.0 | 12,500 |
| 8.3 | 11,400 |
| 8.0 | 9,900 |

Example 19

The following table shows the effect of change of concentration of polyethylene glycol 6000 upon the viscosity of formulations containing 60 percent by weight of ethyl 3,5-diacetamido-2,4,6-triiodobenzoate, 0.22 percent by weight of polyethylene glycol 600 monooleate, 0.01 percent by weight of calcium disodium ethylenediaminetetraacetate, 0.0588 percent by weight of dibasic potassium phosphate ($K_2HPO_4$) and 0.0412 percent by weight of monobasic potassium phosphate ($KH_2PO_4$) relative to the total volume.

| Weight percent of polyethylene glycol 6000 | Viscosity (centipoises) | |
|---|---|---|
| | at 28° C. | at 37.5° C. |
| 7.0 | 2,750 | 8,250 |
| 8.0 | 3,300 | 9,800 |
| 9.5 | 4,500 | 13,200 |

Example 20

The following table shows the effect of change of concentration of ethyl 3,5-diacetamido-2,4,6-triiodobenzoate upon the viscosity of formulations containing 0.25 percent by weight of polyethylene glycol 600 monooleate, and 10 percent by weight of polyethylene glycol 6000 relative to the total volume.

| Weight percent of ethyl 3,5-diacetamido-2,4,6-triiodobenzoate | Viscosity (centipoises) | |
|---|---|---|
| | at 25° C. | at 37.5° C. |
| 55 | 2,850 | 5,900 |
| 65 | 7,125 | 13,200 |
| 70 | 19,400 | 21,625 |

Example 21

A solution of 2000 g. of polyethylene glycol 6000, 62.5 g. of polyethylene glycol 600 monooleate, 14.7 g. of dibasic potassium phosphate ($K_2HPO_4$), 10.3 g. of monobasic potassium phosphate ($KH_2PO_4$), and 2.5 g. of calcium disodium ethylenediaminetetraacetate in 13.41 liters of water was filtered, the filter rinsed with 1 liter of water and the rinsings added to the filtrate. The filtrate was added to 15,000 g. of micronized ethyl 3,5-diacetamido-2,4,6-triiodobenzoate having an average particle size of about 2.1 microns, and the whole was intimately mixed until a smooth creamy paste was obtained. Additional water was then added to give a total volume of 25 liters (total weight 32,850 g.), the suspension thoroughly mixed until homogeneous, and strained through a 100 mesh stainless steel screen. The suspension was then placed into 25 ml. flint vials which were sealed and autoclaved at 121° C. for twenty minutes. The resulting suspension had a pH of 6.8, and viscosities of 2,800 centipoises at 26.5° C. and 10,100 centipoises at 37.5° C.

The foregoing formulation, when instilled into the bronchi of cats produced good to excellent visualization of the bronchial tree in each of fourteen animals with little or no alveolar flooding and complete elimination in one day.

This application is a continuation-in-part of our prior, copending application, Serial No. 679,066, filed August 19, 1957, now abandoned.

We claim:

1. A radiopaque composition comprising a suspension of a finely divided, substantially insoluble, pharmacologically acceptable radiopaque substance in water containing from about 1 to about 20 percent by weight of a polyethylene glycol having an average molecular weight between about 2,000 and 10,000 as a thickening agent and from about 0.01 to about 0.5 percent by weight of a pharmacologically acceptable surfactant, said weight percents being relative to the total volume of the suspension.

2. A composition according to claim 1 wherein the radiopaque substance is present to the extent of from about 50 percent to about 90 percent by weight relative to the total volume of the suspension.

3. A composition according to claim 1 wherein the surfactant is polyethylene glycol 600 monooleate.

4. A radiopaque composition comprising a suspension of from about 50 to about 90 weight percent of a finely divided, substantially insoluble, pharmacologically acceptable radiopaque substance in water containing from about 1 to about 20 percent by weight of polyethylene glycol 6000 as a thickening agent and from about 0.01 to about 0.5 percent by weight of polyethylene glycol 600 monooleate, said weight percents being relative to the total volume of the suspension.

5. A composition according to claim 4 wherein the radiopaque substance is ethyl 3,5-diacetamido-2,4,6-triiodobenzoate.

6. A composition according to claim 4 wherein the radiopaque substance is barium sulfate.

7. A composition according to claim 4 wherein the radiopaque substance is propyl 3,5-diiodo-4-pyridone-N-acetate.

8. A composition according to claim 4 having a viscosity at 37.5° C. of between about 5000 and 20,000 centipoises.

9. A composition according to claim 4 wherein the radiopaque substance is an iodinated organic compound.

References Cited in the file of this patent

UNITED STATES PATENTS

| | | |
|---|---|---|
| 2,779,707 | Jacobson | Jan. 29, 1957 |
| 2,870,063 | Mater | Jan. 20, 1959 |

OTHER REFERENCES

U.S. Dispensatory 25th Ed., 1955, pp. 1081–1083.
Remington's Practice of Pharmacy, Martin and Cook, 1956, 11th ed., pp. 644, 646, 647, 648.